US010038319B2

(12) United States Patent
Livne et al.

(10) Patent No.: US 10,038,319 B2
(45) Date of Patent: Jul. 31, 2018

(54) SMART COUPLING

(71) Applicants: Yigal Livne, Alfei Menashe (IL); Joram Csillag, Tel Aviv (IL); Dan Ellenbogen, Modein (IL)

(72) Inventors: Yigal Livne, Alfei Menashe (IL); Joram Csillag, Tel Aviv (IL); Dan Ellenbogen, Modein (IL)

(73) Assignees: Yigal Livne, Alfei, Menashe (IL); Joram Csillag, Tel Aviv (IL); Dan Ellenbogen, Modein (IL)

( * ) Notice: Subject to any disclaimer, the term of this patent is extended or adjusted under 35 U.S.C. 154(b) by 200 days.

(21) Appl. No.: 15/300,640

(22) PCT Filed: Mar. 25, 2015

(86) PCT No.: PCT/IB2015/052184
§ 371 (c)(1),
(2) Date: Sep. 29, 2016

(87) PCT Pub. No.: WO2015/150980
PCT Pub. Date: Oct. 8, 2015

(65) Prior Publication Data
US 2017/0179717 A1 Jun. 22, 2017

Related U.S. Application Data

(60) Provisional application No. 61/974,464, filed on Apr. 3, 2014.

(51) Int. Cl.
*H02J 1/00* (2006.01)
*H02J 3/00* (2006.01)
(Continued)

(52) U.S. Cl.
CPC ............... *H02J 3/005* (2013.01); *G01L 3/04* (2013.01); *G01L 5/12* (2013.01)

(58) Field of Classification Search
CPC ... H02J 9/061; H02J 1/102; H02J 1/10; G06F 1/26; G06F 1/263; H02P 29/60
(Continued)

(56) References Cited

U.S. PATENT DOCUMENTS 8,981,697 B2 * 3/2015 Zeller .................. H02H 7/0822
318/432
2010/0075296 A1 * 3/2010 Cloake ...................... B01L 7/52
435/3
(Continued)

FOREIGN PATENT DOCUMENTS

| JP | 4944501 B2 | 6/2012 |
| KR | 101101259 B1 | 1/2012 |
| KR | 101187254 B1 | 10/2012 |

OTHER PUBLICATIONS

New Advanced Design Rotary Telemetry System for Driveline Torque & Temperature Measurements Astech Electronics Ltd Jul. 31, 2010.
(Continued)

*Primary Examiner* — Quan Tra
(74) *Attorney, Agent, or Firm* — Gable Gotwals (57) ABSTRACT

This invention relates to a system for protecting rotating electromechanical systems against damages including a coupling configured to connect a moment provider with a load, having first communication means, a first CPU, a first energy providing means and at least one sensor, a control unit having second communication means, second energy providing means, and second CPU, the coupling configured to use the at least one sensor for performing measurements and to communicate with the control unit.

32 Claims, 9 Drawing Sheets

(51) Int. Cl.
*G01L 5/12* (2006.01)
*G01L 3/04* (2006.01)

(58) Field of Classification Search
USPC .......................................................... 307/85
See application file for complete search history.

(56) References Cited

U.S. PATENT DOCUMENTS

| | | |
|---|---|---|
| 2013/0167662 A1 | 7/2013 | Talikoti |
| 2016/0181966 A1* | 6/2016 | Donolo .................. H02P 29/60 318/434 |
| 2017/0170773 A1* | 6/2017 | Donolo .................. H02K 11/21 |

OTHER PUBLICATIONS

M425 Torque Transducer Handbook and Installation Guide Datum Electronics Feb. 17, 2014.

* cited by examiner

Log (view the log)

| Time | Device Type | Device Name | Device UID | Event | Value | Event Details |
|---|---|---|---|---|---|---|
| 12/11/2013 – 23:30 | Control | Pump #7 Motor | 216542524 | Temperature Notification | 112 °C | 20 Samples higher than 110°C (at 1 sample/sec) |
| 12/11/2013 – 23:36 | Remote | Pump #7 Sensor | 654321234 | High Pick Torque Notification | 8.2 nm | 5 Samples higher than 8nm (at 200 samples/sec) |
| 12/11/2013 – 23:45 | Remote | Pump #7 Sensor | 654321234 | Steady State Torque Notification | 3.8 nm | 10 Samples higher than 3.7nm (at 200 samples/sec) |
| 12/11/2013 – 23:55 | Remote | Pump #7 Sensor | 654321234 | Steady State Over Torque | 4.2 nm | 10 Samples higher than 4nm (at 200 samples/sec) - Motor STOPPED !!! |

[Share]  [Save As]  [Print]

Fig. 8

| Name (of notified person / service) | Service selection | Phone No / email/ service address |
|---|---|---|
| Yoram C. | Voice message to phone | +972 50 1234567 |
| Yigal L. | SMS to phone | +972 52 7654321 |
| Danny E. | Email | danny@email.net |
| Danny E. | SMS to phone | +972 53 8934567 |

Services:
- Voice to phone
- SMS to phone
- email
- Messaging (ex: whats-up and others)

SMART COUPLING

CROSS-REFERENCE TO RELATED PATENT APPLICATIONS

This United States patent application is the National Phase of PCT Application No. PCT/IB2015/052184 filed 25 Mar. 2015, which claims priority from and is related to U.S. Provisional Patent Application Ser. No. 61/974,464, filed 3 Apr. 2014, each of which is incorporated by reference in its entirety herein.

FIELD OF THE INVENTION

The present invention generally relates to rotating electromechanical systems and specifically to computerized means for protecting rotating electromechanical systems against damages caused by mechanical overload.

BACKGROUND

A common practice in the design and construction of rotating electromechanical systems is the use of mechanical coupling devices.

A coupling is a device used to connect two shafts together at their ends for the purpose of transmitting power. The primary purpose of couplings is to join two pieces of rotating equipment while permitting some degree of misalignment. Shaft couplings are used in machinery for several purposes, the most common of which are the following:

To provide for the connection of shafts of units that are manufactured separately such as a motor (motor and gear input, gear output and load) and to provide for disconnection for repairs or alterations.

To provide for misalignment of the shafts or to introduce mechanical flexibility.

To reduce the transmission of shock loads from one shaft to another.

To alter the vibration characteristics of rotating units.

Mechanical overload may damage or interrupt the system operation.

The consequences of undetected overload in mechanical systems can be grave. Countless systems suffer overload damages at all times. Overload can occur abruptly (for example some object falling into the rotating area) or build up gradually over many months of operation without being noticed.

When overload failure occurs damages can manifest in many different ways such as local system breakage, production lines stalled for many hours or days, fire hazard etc. Economical impact may be very substantial.

Couplings do not normally allow disconnection of shafts during operation, however there are specialized torque limiting couplings which can slip or disconnect when some torque limit is exceeded. State of the art protected couplings have some disadvantages:

A slipping coupling may slip for a very long time without being noticed.

When slipping is detected maintenance people often tend to just tighten the adjustment screws as a quick fix, overriding intended protection level, therefore making this protection useless.

Disconnecting (mechanical fuse) type protection forces the replacement of the coupling unit device upon failure on top of expenses associated with fixing the major cause of overload.

SUMMARY

According to a first aspect of the present invention there is provided a system for protecting rotating electromechanical systems against damages, comprising:
a coupling configured to connect a moment provider with a load, comprising:
  first communication means;
  first CPU;
  first energy providing means; and
  at least one sensor;
a control unit comprising:
  second communication means;
  second energy providing means; and
  second CPU;
  said coupling configured to use said at least one sensor for performing measurements and to communicate with said control unit.

The first energy providing means may comprise an integrated generator.

The first energy providing means may comprise a battery.

The control unit may additionally comprise a switch configured to switch off or on said moment provider's power.

The coupling may additionally comprise first input means.

The control unit may additionally comprise second input means.

The first input means may comprise at least one of keyboard, computer mouse and a laptop.

The second input means may comprise at least one of keyboard, computer mouse and a laptop.

The coupling may additionally comprise a display connected with said first CPU.

The control unit may additionally comprise a display connected with said second CPU.

The at least one sensor may comprise at least one of torque sensor, vibration sensor, speed sensor, inertial sensor, hall effect sensor, temperature sensor, spin direction sensor and a microphone.

The control unit may additionally comprise at least one sensor.

The at least one sensor may comprises at least one of a temperature sensor, vibration sensor and a microphone.

The first and second communication means may comprise at least one of wireless and wired communication.

The second energy providing means may comprise a power supply.

The second energy providing means may comprise a battery.

According to a second aspect of the present invention there is provided a coupling configured to connect a moment provider with a load, comprising:
a CPU;
energy providing means; and
at least one sensor;
  said coupling configured to sample measurements from said at least one sensor.

The coupling may additionally configured to save said samples.

The at least one sensor may comprise at least one of torque sensor, vibration sensor, speed sensor, inertial sensor, hall effect sensor, temperature sensor, spin direction sensor and a microphone.

The energy providing means may comprise an integrated generator.

The energy providing means may comprise a battery.

The coupling may additionally comprise communication means.

The communication means may comprise at least one of wireless and wired communication.

The coupling may additionally comprise input means.

The input means may comprise at least one of keyboard, computer mouse and a laptop.

The coupling may additionally comprise a display connected with said CPU.

According to a third aspect of the present invention there is provided a control unit configured to communicate with a moment provider, comprising:

a CPU;
at least one sensor;
energy providing means; and
a cutoff switch configured to cut said moment provider power;
said control unit configured to sample measurements from said at least one sensor.

The control unit may additionally be configured to save said samples.

The at least one sensor may comprise at least one of a temperature sensor, a vibration sensor and a microphone.

The control unit may additionally comprise input means.

The input means may comprise at least one of keyboard, computer mouse and a laptop.

The control unit may additionally comprise a display connected with said CPU.

The control unit may additionally comprise communication means.

The communication means may comprise at least one of wireless and wired communication.

The energy providing means may comprise a power supply.

The energy providing means may comprise a battery.

According to a fourth aspect of the present invention there is provided a method of protecting rotating electromechanical systems against damages, comprising:

sampling by a remote device inputs from a moment provider;
comparing said inputs to pre-determined thresholds;
continuously broadcasting messages to a control unit, said messages indicating the remote device's status and the comparison results;
analyzing said messages by the control unit; and
determining whether to cutoff said moment provider's power according to said analysis.

The method may additionally comprise generating power by a generator.

The method may additionally comprise receiving by at least one of said control unit and said remote device at least one operating parameter.

The method may additionally comprise sending by at least one of said control unit and said remote device at least one notification relating to operational measurements.

The method may additionally comprise displaying at least one of event log, notification log and event graph.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

A common practice in the design and construction of rotating electromechanical systems is the use of mechanical coupling devices.

A coupling is a device used to connect two shafts together at their ends for the purpose of transmitting power. The primary purpose of couplings is to join two pieces of rotating equipment while permitting some degree of misalignment.

The present invention aims to provide means for protecting electromechanical systems against damages caused by mechanical overload.

In the following description:

Rotary mechanical coupling refers to remote device.

Figure 1A:
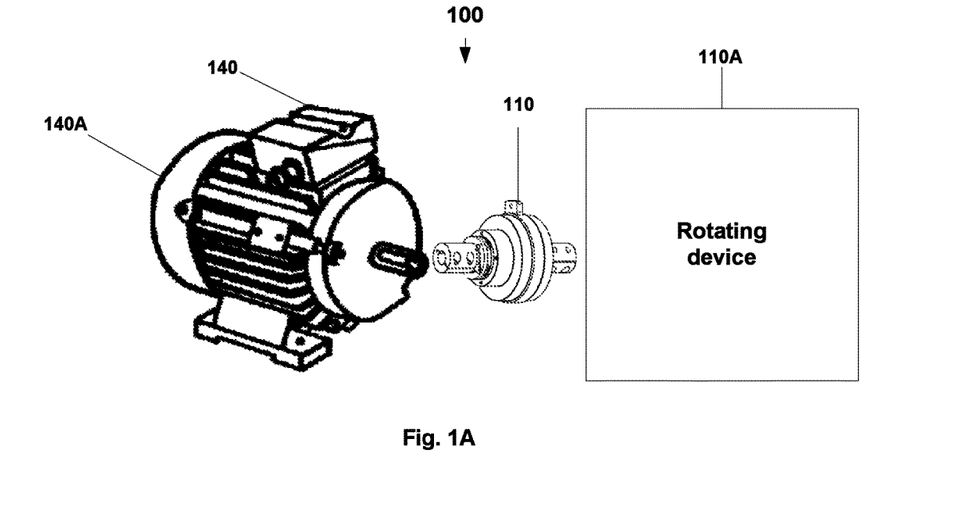
FIG. 1A is a schematic drawing showing system components for carrying out the present invention.

FIG. 1A is a schematic drawing showing a system 100 components, comprising: a control unit 140 connected or adjacent to a moment provider 140A such as a motor, a rotating device 110A such as a pump, compressor, etc. and a rotary mechanical coupling 110 (remote device) that connects the moment provider 140A with the rotating device 110A.

According to embodiments of the present invention, a power or moment transmitting shaft may be connected between the moment provider 140A and the rotary mechanical coupling 110, or between the rotary mechanical coupling 110 and the rotating device 110A.

Figure 1B:
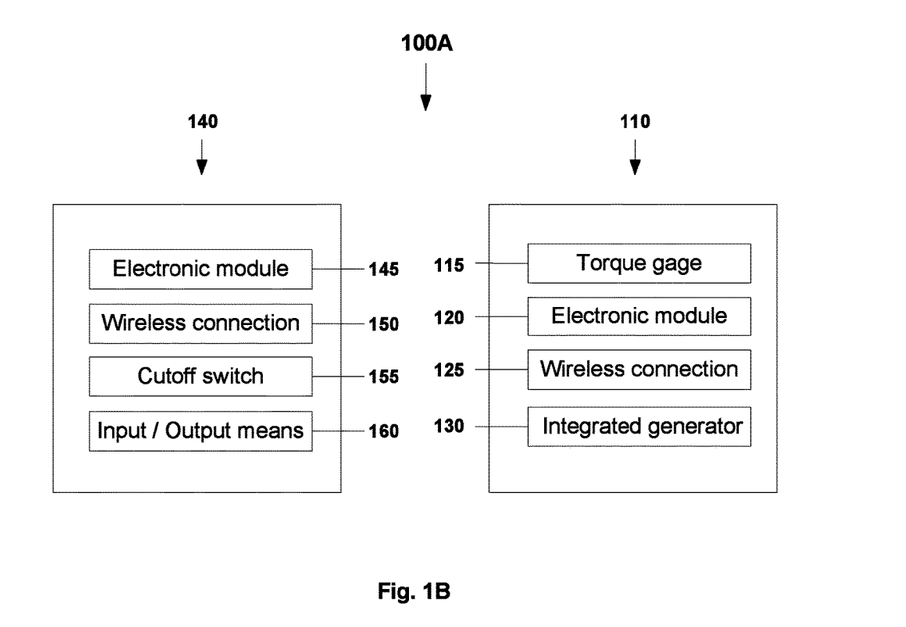
FIG. 1B is a block diagram showing the system components for carrying out the present invention.

FIG. 1B is a block diagram showing the system components for carrying out the present invention.

The system 100A comprises two parts:
1. A rotary mechanical coupling 110, comprising: an embedded torque (moment) gage 115, an electronic module (CPU circuit) 120, a wireless connection 125 and an integrated generator 130.
2. A control unit 140 comprising: an electronic module 145, a wireless connection 150, a cutoff switch 155 and input/output means 160.

The electronic module 120 informs the control unit 140, via wireless connection 125, when a pre-programmed torque threshold has been exceeded (fault condition).

The electronic module 145 may decide to disconnect the moment provider's electrical power in the event of mechanical overload measured by the coupling 110. When the mechanical load exceeds a pre-determined threshold, the moment provider's electrical power is cutoff by a cutoff switch 155.

The integrated generator 130 is the power source of the electronic module 120, which utilizes system rotation to harvest its low required energy consumption. The generator comprises magnets (245 of FIG. 2B) and inductors (250 of FIG. 2B). While the rotary mechanical coupling 110 is rotating, the electrical energy that is created is collected and used as the power source of the electronic module 120. The integrated generator has a charge time close to real time which makes it reliable. In case of a generator's operation failure, the control unit 140 cuts the moment provider's power supply and may issue an alert, thus preventing any possible damage.

Figure 2A:
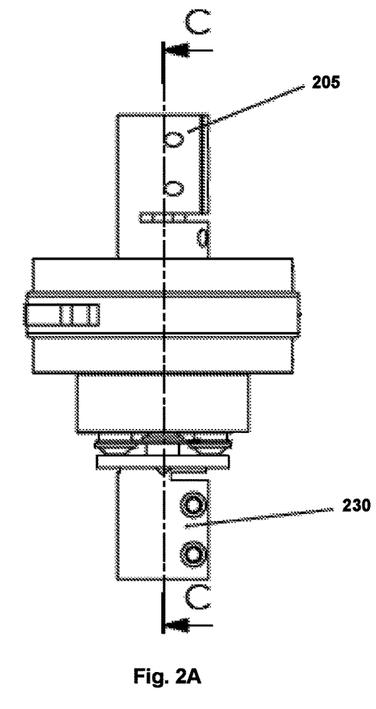
FIG. 2A is a schematic view of an exemplary rotary mechanical coupling according to the present invention.

FIG. 2A is a schematic view of an exemplary rotary mechanical coupling 110 according to embodiments of the present invention, comprising: a user connection 205 and a moment provider connection 230.

Figure 2B:
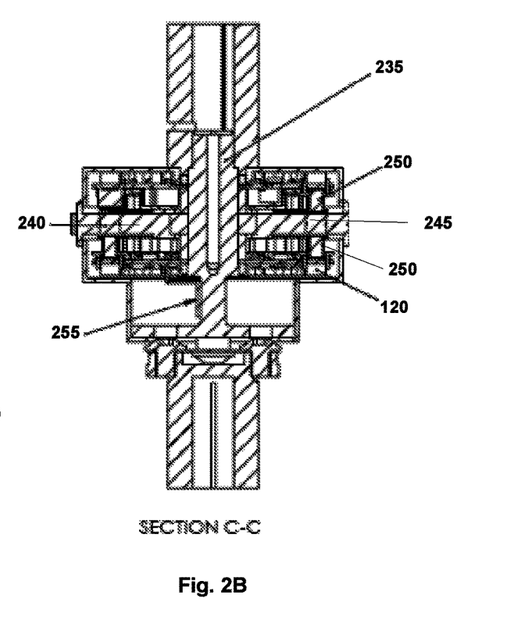
FIG. 2B is a schematic view of section C-C of FIG. 2A.

FIG. 2B is a schematic view of section C-C of FIG. 2A, comprising: a torsion axis 235, a power supply circuit disk (integrated generator disk) 240, magnets 245, inductors 250, a CPU circuit (electronic module) 120 and a strain gauge 255.

The coupling 110 is configured to join two pieces of rotating equipment while permitting some degree of misalignment, furthermore, it comprises a torque measurement system.

The torque measurement system measures the torque using an electrical circuit that measures the resistance, such as, for example, Wheatstone bridge. The resistors value changes depending on the mechanical deformation of the torsion axis.

According to embodiments of the present invention, the torque measurement system may measure the torque by any torque measurement method known in the art and is not limited to the one described hereinabove.

The electronic module 120 measures operational parameters such as torque and optionally speed, spin direction, vibrations, sound, temperature, etc. and transmits the measured values to the control unit 140. The control unit receives the measurements transmission(s) and may comprise additional sensors such as a temperature sensor and a microphone, for noise measurements, which enables it to perform additional tests.

The measurements may be saved both in the rotary mechanical coupling 110 and in the control unit 140.

Figure 2C:
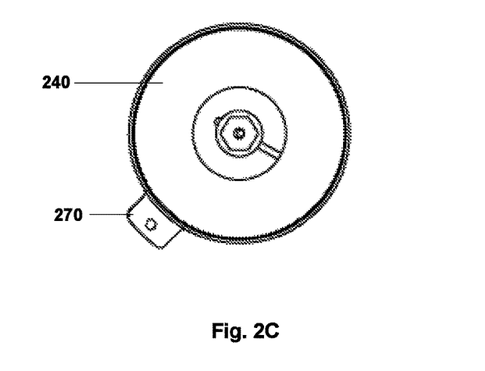
FIG. 2C is an integrated generator's disk.

FIG. 2C demonstrates the integrated generator disk 240 with the connection 270 that is configured to ensure fixation of the disk while the rotary mechanical coupling 110 is rotating.

Figure 3:
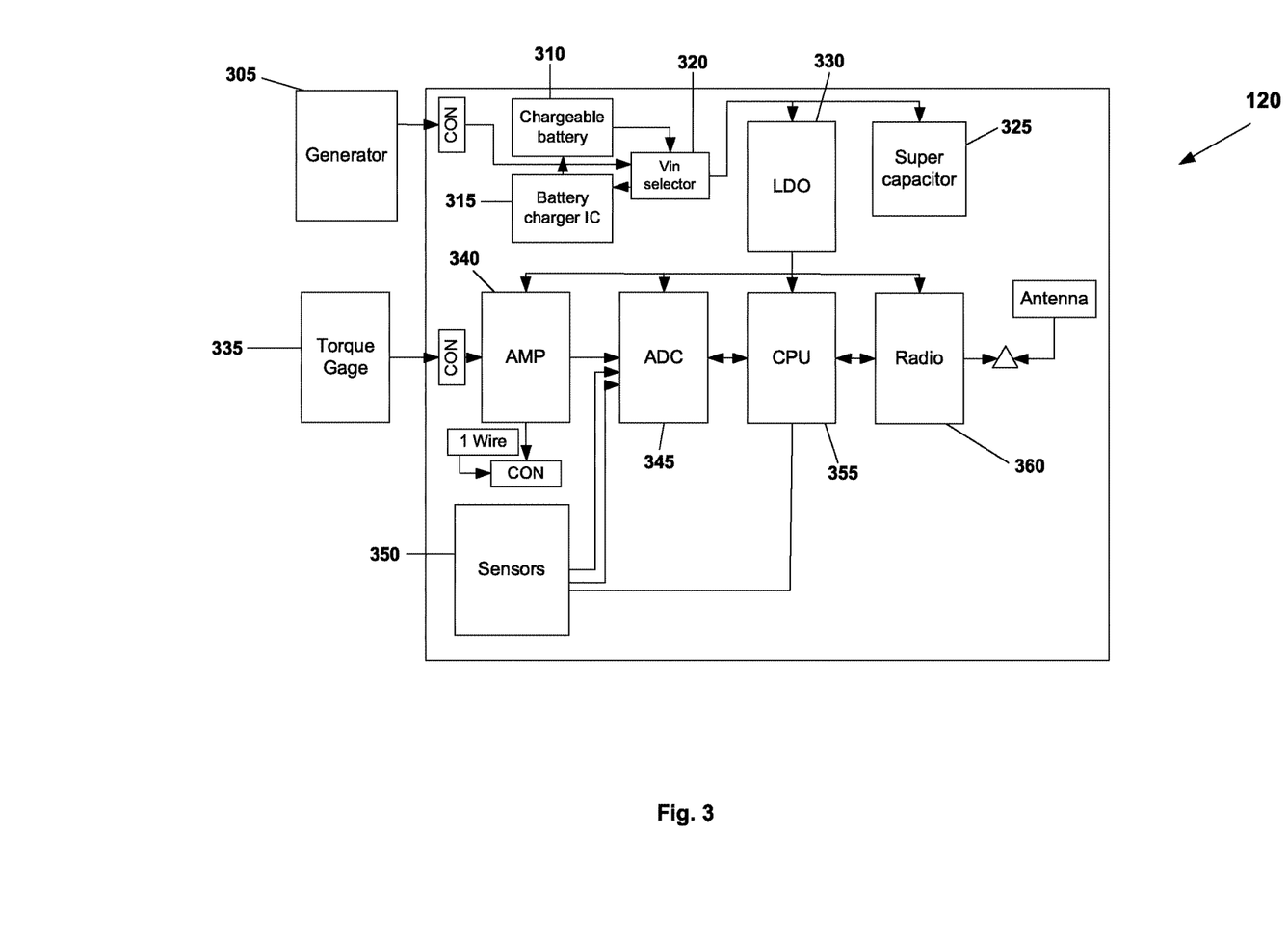
FIG. 3 shows an exemplary rotary mechanical coupling according to the present invention.

FIG. 3 shows an exemplary rotary mechanical coupling 110 according to embodiments of the present invention, comprising:

Generator 305—a module equipped with coils and rectification circuits used for utilizing device rotation for generating electrical power for powering coupling device electronics. The generator may be mechanically and electrically connected to the main coupling device electronic module 120.

Chargeable Battery 310—enables powering full functional operation of the coupling device in the first seconds after power down till generator power is fully available.

Battery Charger IC 315—and supporting electronics for recharging the chargeable battery when generator power is available for future use.

Vin Selector 320—selects the power source—generator if available, battery otherwise.

Super Capacitor 325—stores generator energy for coupling device's operation on main voltage bus.

LDO (Low Dropout Voltage regulator) 330—regulates voltage bus and produces all low DC voltages required by the various components.

Torque Gage 335—one or few strain gage stickers bonded to the coupling device's mechanical structure—measures real-time torque value between coupling input and output.

AMP 340—an analog amplifier that amplifies low voltage received from the strain gage.

ADC (Analog to Digital Converter) 345—an analog to digital conversion module equipped with an analog switch. Used for translating real-time analog voltage levels into digital values that can be processed by the CPU.

Sensors 350—various additional and optional analog or digital output sensors devices such as inertial, temperature, hall effect, encoders and the like.

CPU 355—controls, monitors, coordinates and supervises all coupling device's chips and operation.

Figure 4:
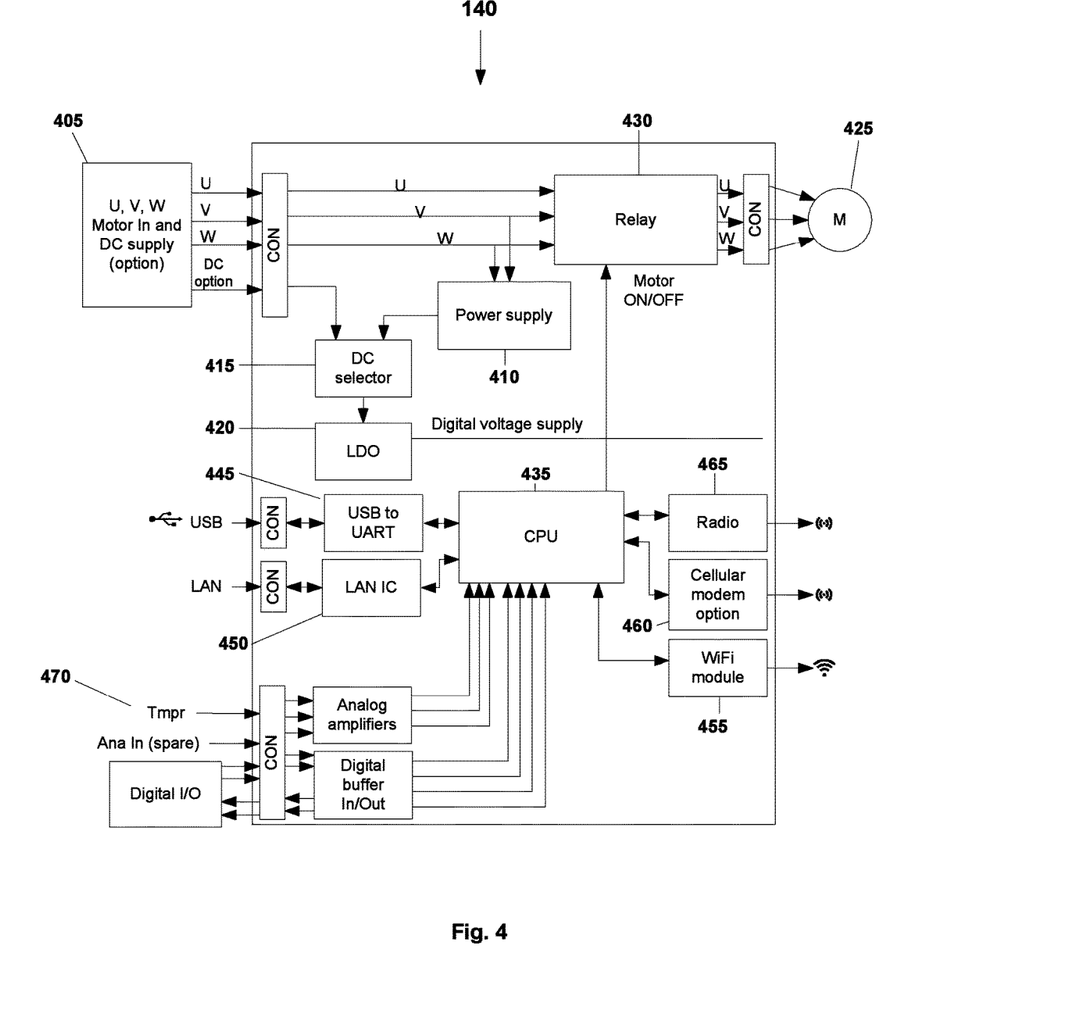
FIG. 4 shows an exemplary control unit according to the present invention.

Radio 360—transmits and receives data between the coupling's CPU 355 and the control unit's CPU 435 (FIG. 4).

FIG. 4 shows an exemplary control unit 140 according to embodiments of the present invention, comprising:

Motor in 405—single or multiphase motor voltage enters the control unit from the system's electrical cabinet. The power required for operation of the control unit is taken from the motor voltage or optionally directly supplied from the electrical cabinet.

Power Supply 410—converts AC motor voltage into DC low voltage to supply control unit requirements.

DC Selector 415—selects power source for the unit—direct DC supply if available or power supply output.

LDO (Low Dropout Voltage Regulator) 420—regulates voltage bus and produces all low DC voltages required by the various components.

M 425—system motor or actuator connects to the protected rotating mechanical system that is mechanically attached to the coupling device.

Relay 430—switches motor ON or OFF by CPU control (cutoff switch).

CPU 435—controls, monitors coordinates and supervises control unit's chips, communication devices and operation system.

Communication Chips—various communication chips enable connection to Ethernet LAN, Internet and Cellular networks by wired and wireless communication links. The various communication chips are controlled and operated by the CPU:

USB to UART 445—enables direct USB link to computer, laptop, tablets, smart phones and the like.

LAN Module 450—enables wired Ethernet LAN link.

Wi-Fi Module 455—enables wireless Ethernet LAN link.

Cellular Modem 460—enables wireless communication to cellular networks.

Radio 465—communicates CPU 435 to CPU 355. Receives data, fault alarms and notifications from the coupling. Transmits configuration data and handshakes with coupling radio.

Sensors 470—various additional analog or digital output sensors such as temperature sensors can be monitored in real-time.

Figure 5:
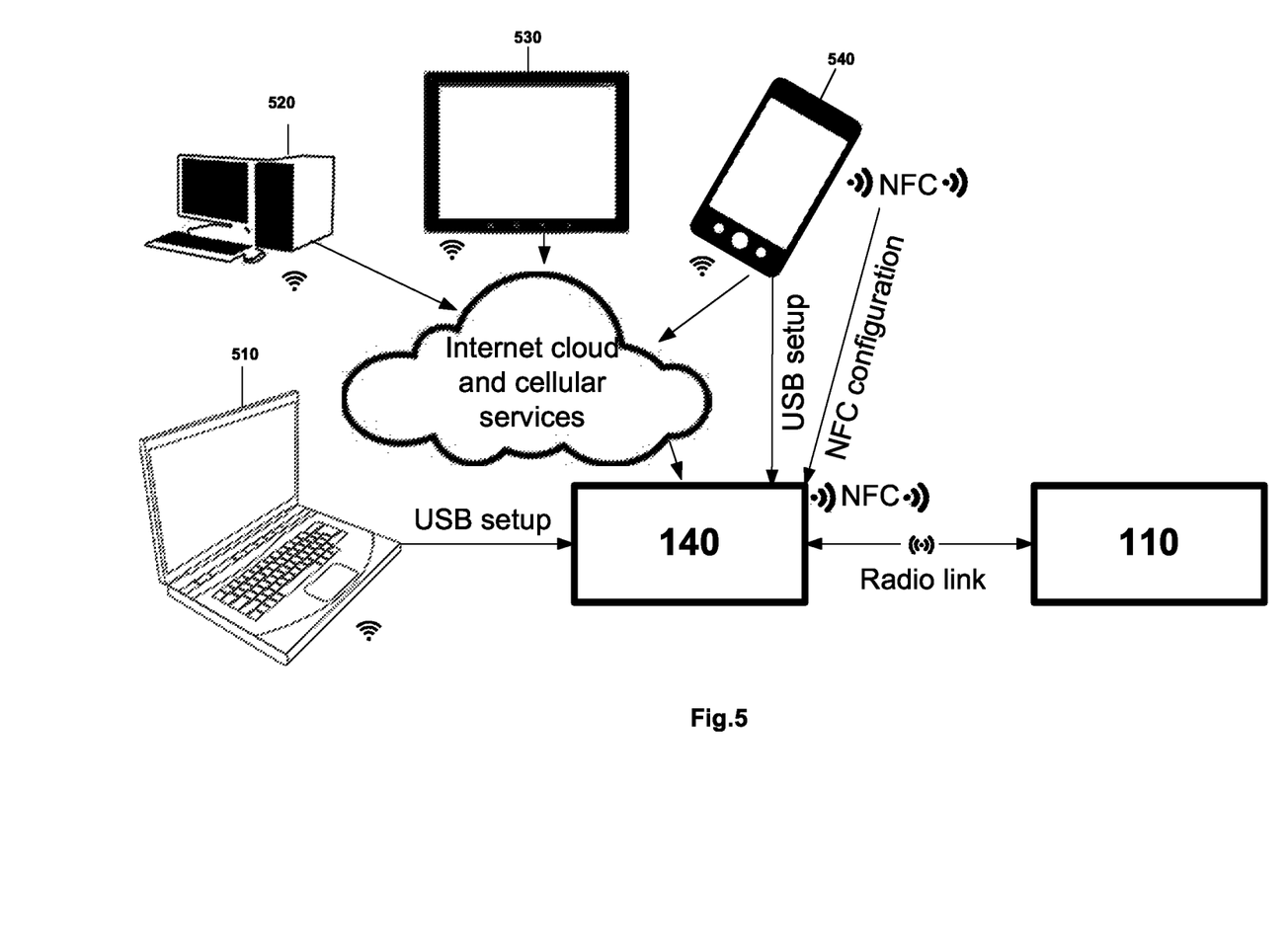
FIG. 5 is a schematic drawing showing the system communication.

FIG. 5 is a schematic drawing showing the system 100A communication.

The control unit 140 may be connected to a laptop 510, PC 520, tablet 530, smart phone 540, etc. via wired or wireless connection in order to receive operating parameters such as torque limit, send notifications and diagnostics about the system behavior that inform of a problem in real time, provide a periodic report by day, week, month, etc., event logs, graphs, etc. to a control center, a mechanical support technician, etc. The control unit 140 and the rotary mechanical coupling 110 are connected via wireless connection:

The rotary mechanical coupling 110 may receive the torque limit input value from the control unit 140.

The control unit 140 receives a notification from the rotary mechanical coupling 110 when a torque threshold is exceeded.

The control unit 140 receives measurements of: torque and optionally speed, spin direction, vibrations, etc. from the rotary mechanical coupling 110.

Operating parameters such as torque limit may be pre-programmed manually by a technician using a laptop, tablet, smart phone, etc. via wired or wireless connection with the control unit 140.

According to embodiments of the invention, the rotary mechanical coupling 110 or the control unit 140 may collect torque measurements for a pre defined time, calculate the average torque and set it as the torque limit.

The rotary mechanical coupling 110 may also allow a torque range and not only a single value. The torque range prevents cases of moment provider's disconnection due to momentary overload, moreover, the torque range may enable the control unit 140 to send notifications in different levels of importance and urgency to the control center or the mechanical support technician and thus anticipate system failure. For example, if the control center or the mechanical support technician gets frequent notifications about measured torques near the torque range's upper limit, they may conclude that at least one of the elements of the system is about to fail.

Notifications and diagnostics may be sent by the control unit 140 as mentioned above and may also be saved as a log and/or graphs in the control unit or in internet cloud services etc. to be derived later.

The control unit 140 monitors the system behavior. Monitoring may be done in several ways.

Figure 6:
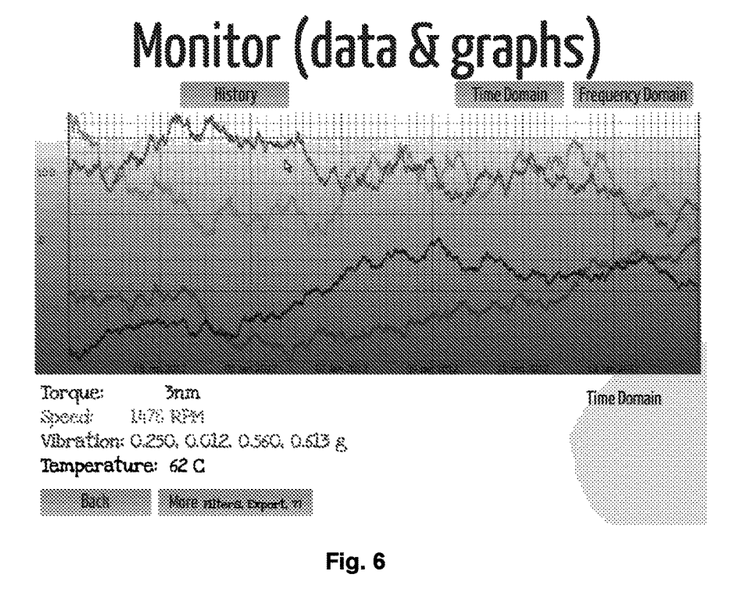
FIG. 6 is an exemplary graph representing monitoring in the time domain.

FIG. 6 is an exemplary graph representing monitoring in the time domain. For each day the control unit may monitor the torque, speed, vibration, noise, temperature, etc. and display them in a graph (some of the data may be received from the rotary mechanical coupling 110).

Figure 7:
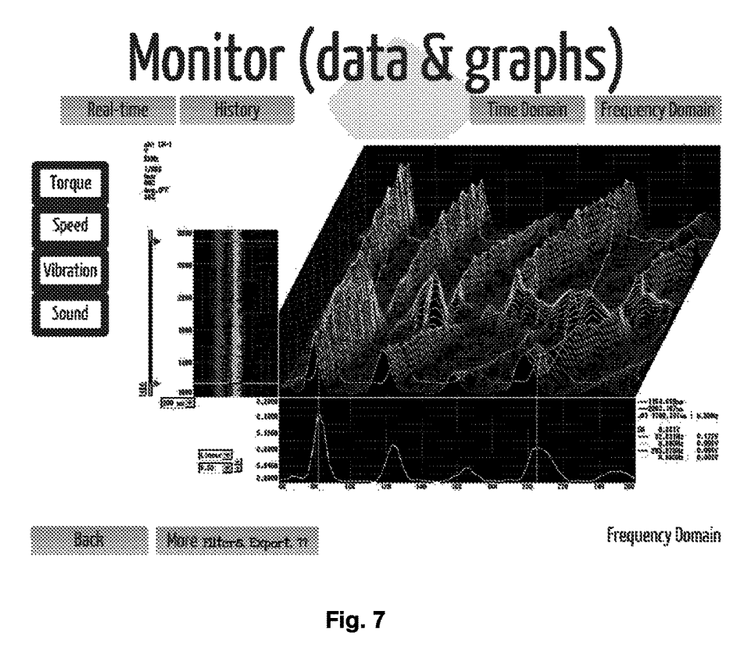
FIG. 7 is an exemplary graph representing monitoring in the frequency domain.

FIG. 7 is an exemplary graph representing monitoring in the frequency domain. For each frequency the control unit may monitor the torque, vibration, noise, speed, etc. and display them in a graph (some of the data may be received from the rotary mechanical coupling 110).

For each graph the user may choose to view the real time data or the history data that has been saved in the system. The user may also choose to add a filter on the graph in order to observe specific characteristics. He may also choose to save or export the data that has been collected.

Figure 8:
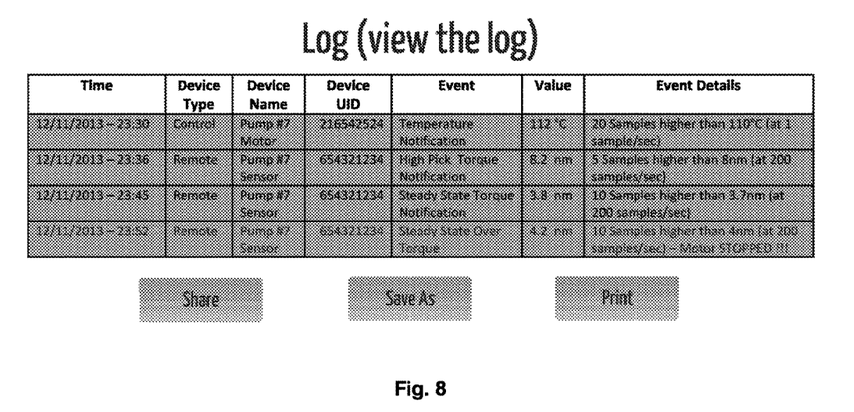
FIG. 8 is an exemplary events log.

FIG. 8 is an exemplary events log according to embodiments of the invention. For each event the log may save the date and hour, device type, device UID, event, value and event details for a periodic monitoring.

Each device (110 and 140) has a unique UID in order to ensure that the electronic module 120 communicates only with its specific control unit 140 and not other system's unit.

The events log may be shared, saved, printed, etc. for various uses.

Figure 9:
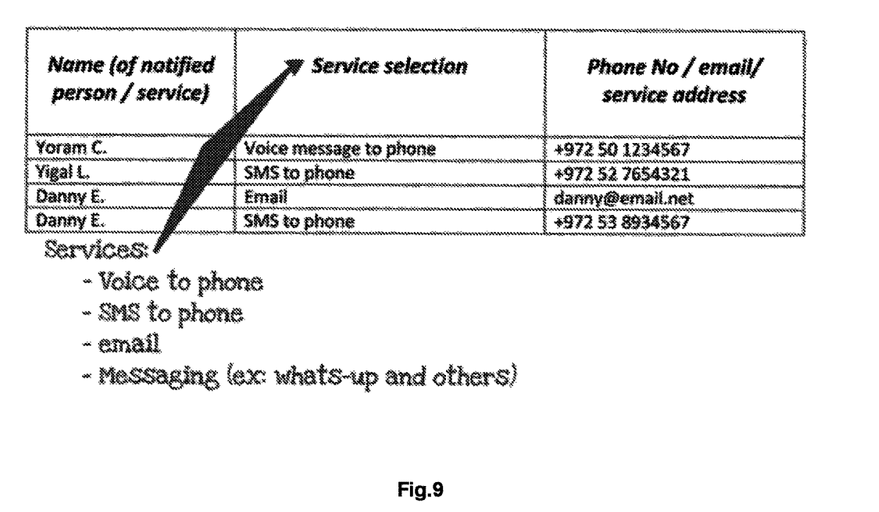
FIG. 9 is an exemplary notification log.

FIG. 9 is an exemplary notification log according to embodiments of the invention. The control unit 140 may send the notifications as mentioned above by voice, SMS, E-Mail, messaging applications (such as WhatsApp), etc.

According to embodiments of the present invention, a number of systems may be connected in hierarchical order. For example, if a number of moment providers are connected in a row and the first moment provider ceases to work the system may stop all the other moment providers as well in order to prevent overload.

Figure 10:
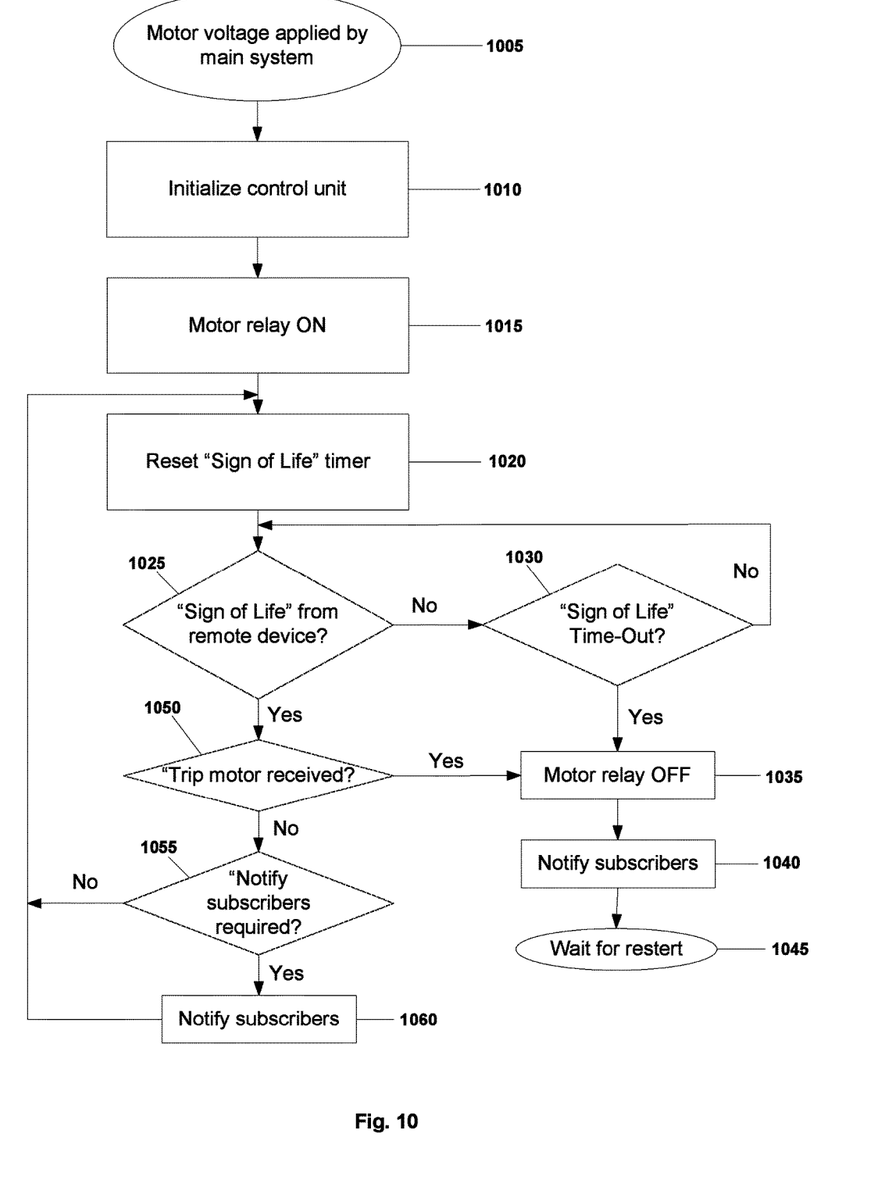
FIG. 10 is a flowchart showing the process performed by the control unit according to the present invention.

FIG. 10 is a flowchart showing the process performed by the control unit 140 according to embodiments of the present invention.

The process starts in step 1005 as soon as the moment provider's (the motor in this embodiment) power is turned on. In step 1010 the control unit 140 is initialized and in step 1015 the motor relay (cutoff switch) is turned on. The relay enables/disables the moment provider's operation as mentioned above. In step 1020 the unit resets the "sign of life" timer. The "sign of life" is a sign that the remote device is working. In step 1025 the unit checks if a "sign of life" message has been received from the remote device 110. If it hasn't, the unit checks in step 1030 if the "sign of life" timer is timed out. If it isn't, the process goes back to step 1025; if it is, it means that there is a problem with the remote device 110 and the relay (cutoff switch) is turned off (step 1035) to prevent any possible damage. In step 1040 the unit may issue a notification according to predefined specifications (optional) and in step 1045 it waits for restart. If in step 1025 a "sign of life" message has been received, the unit continues to step 1050 and checks if a "trip motor" message has been received. The "trip motor" message indicates a problem detected by the remote device (such as overload). If the "trip motor" message has been received, the unit continues to steps 1035, 1040 and 1045. If it hasn't, the unit checks in step 1055 if a notification is required, according to predefined specifications, if it isn't, the process goes back to step 1020; if it is, the unit issues a notification in step 1060 and goes back to step 1020.

Figure 11:
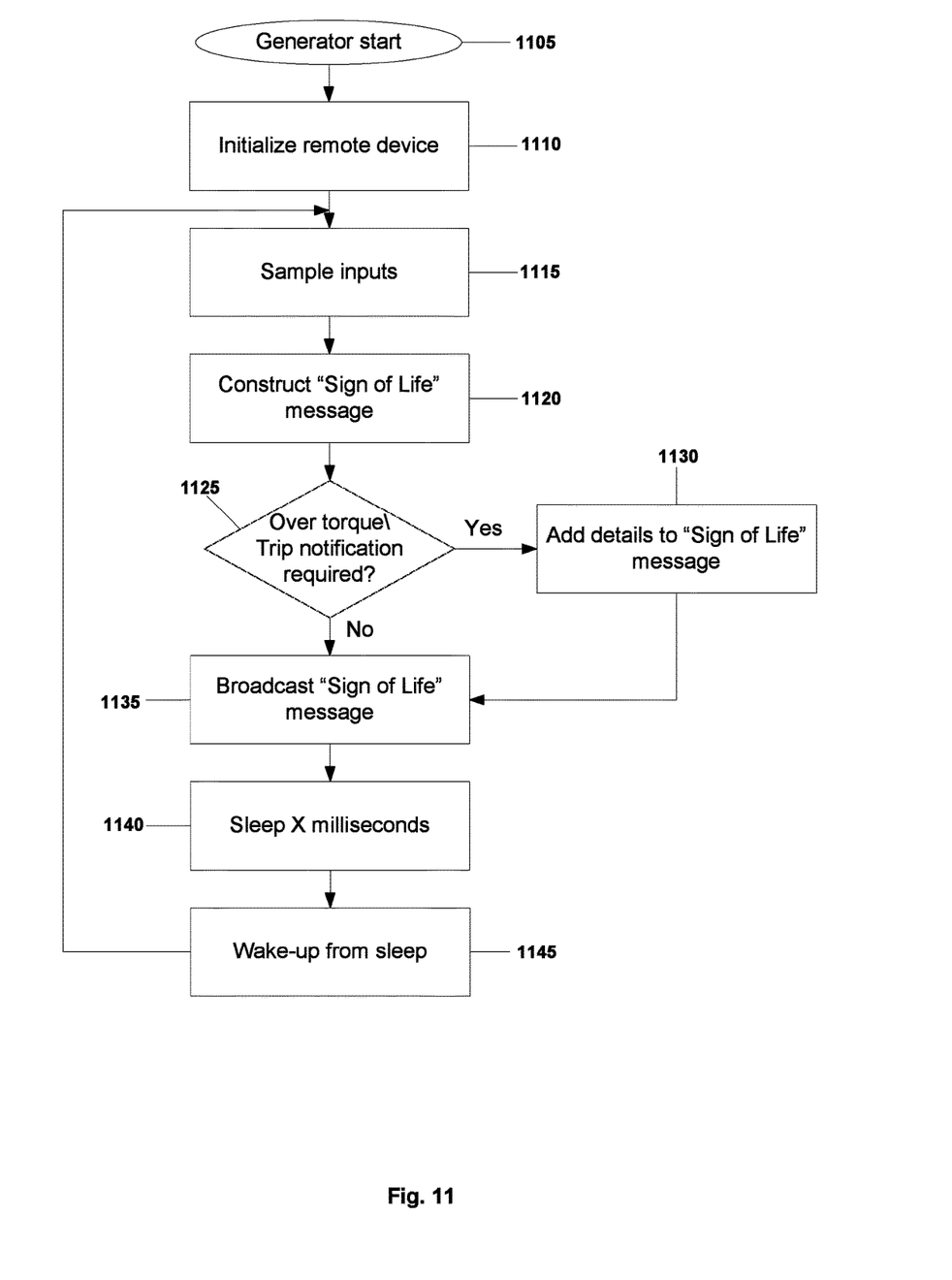
FIG. 11 is a flowchart showing the process performed by the remote device according to the present invention.

FIG. 11 is a flowchart showing the process performed by the remote device according to embodiments of the present invention.

The process starts in step 1105 as soon as the generator starts to work. In step 1110 the remote device is initialized and in step 1115 the device starts to sample inputs. In step 1120 the device constructs a "sign of life" message and checks, in step 1125, if a trip notification is required according to the inputs. If it is, the device adds a "trip motor" message to the "sign of life" message in step 1130 and broadcasts the "sign of life" message in step 1135. If it isn't, the process continues directly to step 1135 and broadcasts the "sign of life" message. In step 1140 the device goes to "sleep" for X milliseconds in order to save energy and "wakes up" in step 1145. The "sleep" time enables the system to save energy in cases where the harvested voltage is low. As soon as the process "wakes up" it goes back to step 1115.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive. Further, it is understood that certain features of specific aspects of the invention could be combined with specific features detailed in other aspects of the invention, so that any embodiment of the invention could include one or all of the features disclosed herein.

The invention claimed is:

1. A system for protecting rotating electromechanical systems against damages: comprising:
    a coupling configured to connect a moment provided with a load, said coupling comprising:
        first communication means for providing information;
        first central processing unit;
        first energy providing means for supplying power; and
        at least one coupling sensor;
    a control unit connected with said moment provider, said control unit comprising:
        second communication means for providing information;
        second energy providing means for supplying power;
        at least one control unit sensor;
        a cutoff switch; and
        second central processing unit;
    said coupling and said control unit configured to communicate with each other;
    said control unit configured to cutoff said moment provider's power when at least one predetermined threshold is exceeded based on measurements taken by at least one of said at least one coupling sensor and said at least one control unit sensor.

2. The system of claim 1, wherein said first energy providing means for supplying power comprise an integrated generator.

3. The system of claim 1, wherein said first energy providing means for supplying power comprise a battery.

4. The system of claim 1, wherein said coupling additionally comprises first input means for inputting information.

5. The system of claim 1, wherein said control unit additionally comprise second input means for inputting information.

6. The system of claim 5, wherein said first input means comprise at least one of keyboard, computer mouse and a laptop.

7. The system of claim 5, wherein said second input means comprise at least one of keyboard, computer mouse and a laptop.

8. The system of claim 1, wherein said coupling additionally comprises a display connected with said first central processing unit.

9. The system of claim 1, wherein said control unit additionally comprises a display connected with said second central processing unit.

10. The system of claim 1, wherein said at least one coupling sensor comprises at least one sensor selected from the group consisting of torque sensor, vibration sensor, speed sensor, inertial sensor, hall effect sensor, temperature sensor, spin direction sensor, and a microphone.

11. The system of claim 10, wherein said at least one control unit sensor comprises at least one sensor selected from the group consisting of a temperature sensor, vibration sensor, and microphone.

12. The system of claim 1, wherein said first and second communication means comprise at least one of wireless and wired communication.

13. The system of claim 1, wherein said second energy providing means comprise a power supply.

14. The system of claim 1, wherein said second energy providing means comprise a battery.

15. A coupling configured to connect a moment provider with a load, said coupling comprising:
    a central processing unit;
    an integrated generator configured to utilize said coupling's rotation to harvest its required energy consumption; and
    at least one sensor;
    said coupling configured to sample measurements from said at least one sensor and to communicate with a control unit connected with said moment provider, said control unit configured to cutoff said moment provider's power when at least one predetermined threshold is exceeded based on said measurements.

16. The coupling of claim 15, additionally configured to save said samples.

17. The coupling of claim 15, wherein said at least one sensor comprises at least one member selected from the group consisting of torque sensor, vibration sensor, speed sensor, inertial sensor, hall effect sensor, temperature sensor, spin direction sensor and a microphone.

18. The coupling of claim 15, additionally comprising communication means for providing information.

19. The coupling of claim 18, wherein said communication means comprise at least one of wireless and wired communication.

20. The coupling of claim 13, additionally comprising input means for inputting information.

21. The coupling of claim 20, wherein said input means comprise at least one input device selected from the group consisting of keyboard, computer mouse and a laptop.

22. The coupling of claim 15, additionally comprising a display connected with said central processing unit.

23. A method of protecting rotating electromechanical systems against damages, said method comprising:
    providing a coupling connected with a moment provider and a load; and a control unit connected with said moment provider; said coupling and said control unit configured to communicate with each other;
    sampling by said coupling first inputs from said moment provider;
    continuously broadcasting by said coupling messages to said control unit;
    analyzing said messages and said second inputs samples by said control unit; and
    cutting off said moment provider's power when at least one predetermined threshold is exceeded based on said analysis.

24. The method of claim 23, additionally comprising generating power by a generator.

25. The method of claim 23, additionally comprising receiving by at least one of said control unit and said coupling at least one operating parameter.

26. The method of claim 23, additionally comprising sending by at least one said control unit and said coupling at least one notification relating to operational measurements.

27. The method of claim 23, additionally comprising displaying at least one of event log, notification log, and event graph.

28. The method of claim 23, wherein said messages comprise said coupling's status and comparison results of said first inputs samples to determined thresholds.

29. The method of claim 23, wherein at least one of said determined thresholds is determined by one of said coupling and said control unit.

30. The method of claim 23, wherein said messages comprise said coupling's status and said first inputs samples.

31. A method of protecting rotating electromechanical systems against damages, comprising:
   providing a coupling connected with a moment provider and a load; and a control unit connected with said moment provider; said coupling and said control unit configured to communicate with each other;
   sampling by said coupling inputs from said moment provider;
   calculating by one of said coupling and said control unit torque inputs average and setting said average as a torque threshold;
   continuously broadcasting by said coupling messages to control unit;
   analyzing said messages by said control unit; and
   cutting off said moment provider's power when at least one threshold is exceeded based on said analysis.

32. A system for protecting rotating electromechanical systems against damages, comprising:
   a coupling configured to connect a moment provider with a load, said coupling comprising:
      first communication means for providing information;
      first central processing unit;
      an integrated generator configured to utilize said coupling's rotation to harvest its required energy consumption; and
      at least one sensor;
   a control unit connected with said moment provider, said control unit comprising:
      second communication means for providing information;
      energy providing means for supplying power;
      a cutoff switch; and
      second central processing unit;
   said coupling and said control unit configured to communicate with each other;
   said coupling configured to use said at least one sensor for performing measurements and to communicate with said control unit.

* * * * *